US005214631A

United States Patent [19]
Maeda et al.

[11] Patent Number: 5,214,631
[45] Date of Patent: May 25, 1993

[54] DISC RECORDING/REPRODUCING APPARATUS HAVING A SERVO SYSTEM CAPABLE OF SUCCESSIVELY RECORDING AND REPRODUCING TRACKS ON A DISC IRRESPECTIVE OF TURBULENCE OF THE SERVO SYSTEM DUE TO A DISTURBANCE

[75] Inventors: Yasuaki Maeda; Yuji Arataki, both of Tokyo; Tadao Yoshida, Kanagawa, all of Japan

[73] Assignee: Sony Corporation, Tokyo, Japan

[21] Appl. No.: 717,700

[22] Filed: Jun. 19, 1991

[30] Foreign Application Priority Data

Jun. 29, 1990 [JP] Japan .................................. 2-169977

[51] Int. Cl.⁵ .................................................. G11B 20/10
[52] U.S. Cl. ....................................... 369/59; 369/124
[58] Field of Search ................... 369/59, 111, 124, 32; 358/341, 342, 343; 360/10.1, 10.3, 9.1, 8

[56] References Cited

U.S. PATENT DOCUMENTS

| 4,796,123 | 1/1989 | Takeuchi et al. ................... 360/10.1 |
| 4,796,247 | 1/1989 | Volgelsang . |
| 5,034,827 | 7/1991 | Fukatsu et al. ..................... 360/10.3 |
| 5,070,419 | 12/1991 | Kiyonaga ........................... 360/10.3 |

FOREIGN PATENT DOCUMENTS

| 0155970A1 | 10/1985 | European Pat. Off. . |
| 0196590A3 | 10/1986 | European Pat. Off. . |
| 0249781A2 | 12/1987 | European Pat. Off. . |
| 0283727A2 | 9/1988 | European Pat. Off. . |
| 0429139A1 | 5/1991 | European Pat. Off. . |
| 2317726 | 2/1977 | France . |
| 1560494 | 2/1980 | United Kingdom . |
| 2136192A | 9/1984 | United Kingdom . |

*Primary Examiner*—Donald E. McElheny, Jr.
*Attorney, Agent, or Firm*—Philip M. Shaw, Jr.

[57] ABSTRACT

During recording the inputted data are sequentially written into a memory at one transfer rate and are read out at a second, higher transfer rate for recording on a record medium. The reading of the memory is such that data in a preset first amount are successively read from the memory to always ensure a write space in the memory which has a capacity which is higher than a predetermined second amount when the amount of the inputted data stored in the memory exceeds the first amount. During playback, the recorded data are reproduced at a second transfer rate, which is higher than a first transfer rate required for outputting the reproduced data, and are written in the memory. The thus written data are successively read out of the memory as reproduced output data at the first transfer rate. The writing of the reproduced data to the memory is controlled so that a second amount of the reproduced data is written into the memory and an amount of reproduced data, not less than a first amount, is always stored in the memory when the amount of the reproduced data stored in the memory becomes not higher than the first given amount.

17 Claims, 5 Drawing Sheets

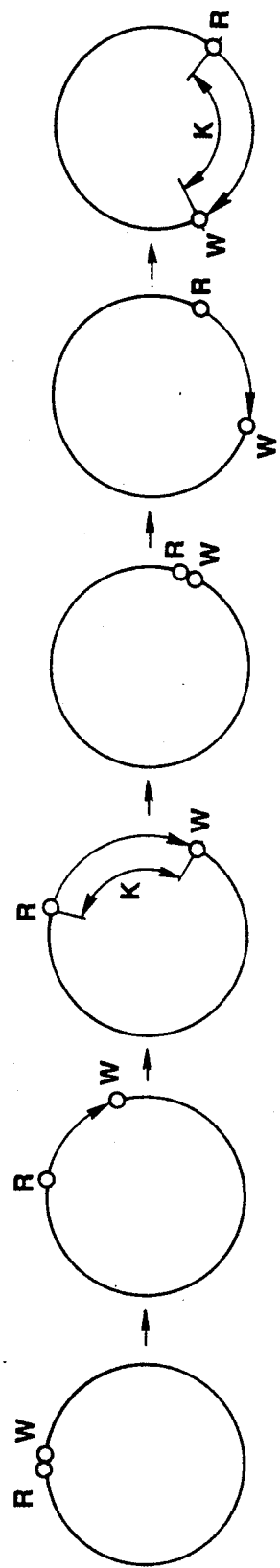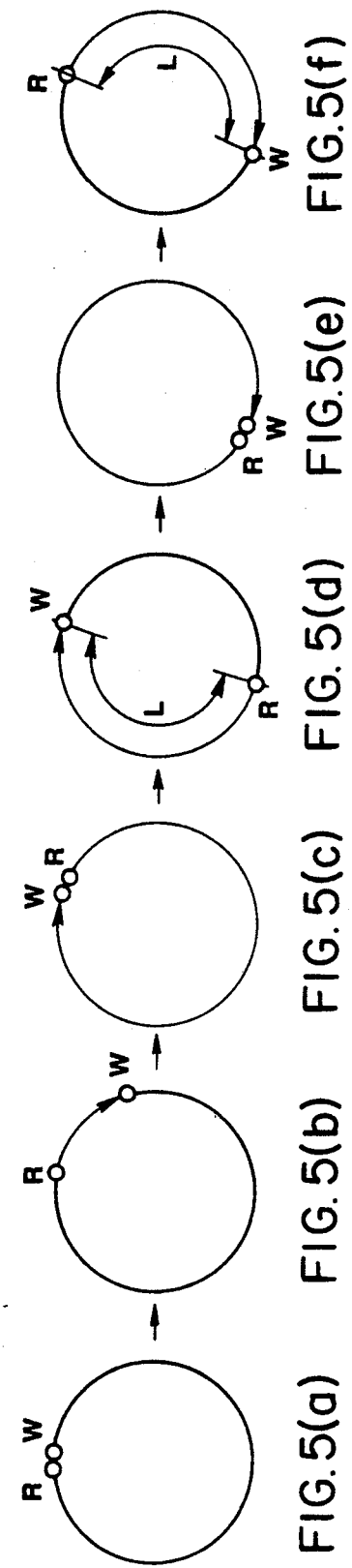

| SYSTEM | SOUND QUALITY LEVEL | 16 SECTORS | REPRODUCTION TIME | |
|---|---|---|---|---|
| ADPCM | A LEVEL STEREO | ▨□□▨□□▨□□▨□□▨□□▨ | 2HOURS | CD-I |
| ADPCM | A LEVEL MONAULAL | ▨□□□▨□□□▨□□□▨□□□ | 4HOURS | |
| ADPCM | B LEVEL STEREO | ▨□□□▨□□□▨□□□▨□□□ | 4HOURS | |
| ADPCM | B LEVEL MONAULAL | ▨□□□□□□□▨□□□□□□□ | 8HOURS | CD-ROM XA |
| ADPCM | C LEVEL STEREO | ▨□□□□□□□▨□□□□□□□ | 8HOURS | |
| ADPCM | C LEVEL MONAULAL | ▨□□□□□□□□□□□□□□□ | 16HOURS | |
| PCM | CD-DA | ▨▨▨▨▨▨▨▨▨▨▨▨▨▨▨▨ | 62～75MIN. | |

FORMAT OF CD-I

FIG.6

DISC RECORDING/REPRODUCING APPARATUS HAVING A SERVO SYSTEM CAPABLE OF SUCCESSIVELY RECORDING AND REPRODUCING TRACKS ON A DISC IRRESPECTIVE OF TURBULENCE OF THE SERVO SYSTEM DUE TO A DISTURBANCE

FIELD OF THE INVENTION

The present invention relates to a disc recording apparatus for successively recording successively input data on a disc recording medium and a disc reproducing apparatus for obtaining successively reproduced output data from the disc recording medium.

BACKGROUND OF THE INVENTION

In a disc apparatus, such as CD player which plays back a compact disc (CD) having concentric tracks on which digital audio data are recorded as a pit train, the disc is irradiated with a laser beam along the tracks thereon while the disc is driven to rotate at a constant linear velocity by a spindle motor. The digital audio data are reproduced by detecting changes in the strength of the reflected light due to the presence or absence of the pits.

Although the error rate on reproduction of the data may be, for example, about $10^{-5}$ in the CD player, the reproduced data are subjected to an error correction processing using error detection codes and error correction codes so that no problem will occur in the normal application environment.

In a CD player, which includes an optical reproducing head, a servo system, such as a focus servo or a tracking servo for the reproducing head, will deviate due to mechanical disturbances such as vibration or shock so that normal data reproduction may become difficult. In such a case, an error can not be corrected even if the above mentioned error detection codes or error correction codes are used, so that reproduction may be temporarily interrupted.

In a CD player for vehicles or a portable CD player, which have a high possibility of experiencing a large vibration or shock, unlike a desk top type home use CD player, a mechanical anti-vibration mechanism has heretofore been provided to prevent the servo system from deviating due to disturbance as mentioned above.

In the so-called CD-I (CD-interactive) system for simultaneously recording video data, character data, and audio information on the compact disc, 6 modes have heretofore been standardized in addition to a CD digital audio (CD-DA) mode as shown in FIG. 6.

Linear PCM (Pulse Code Modulation) having a sampling frequency of 44.1 kHz and a quantization number of 16 bits is used in the CD-DA mode having a level of sound quality equivalent to existing 16 bits PCM. ADPCM (Adaptive Differential Pulse Code Modulation) having a sampling frequency of 37.8 kHz and a quantization number of 8 bits is used in the A level stereo mode and A level monaural mode having a sound quality equivalent to an LP disc record.

ADPCM having a sampling frequency of 37.8 kHz and a quantization number of 4 bits is used in the B level stereo mode and the B level monaural mode having a sound quality equivalent to FM broadcasting. ADPCM having a sampling frequency of 18.9 kHz and a quantization number of 4 bits is used in the C level stereo mode and C level monaural mode equivalent to AM broadcasting.

In other words, as shown in FIG. 6, the bit saving factor is ½ in the A level stereo mode in comparison with CD-DA mode. Data are recorded at intervals of 2 sectors. The black squares in the drawing represent recorded sectors. The reproduction or playback period of time of one disc is about 2 hours. The bit saving factor is ¼ in the A level monaural mode. Data are recorded at intervals of four sectors. The reproduction period time is about 4 hours. The bit saving factor is ⅛ in the B level monaural mode. Data are recorded at intervals of 8 sectors. The reproduction period of time is about 8 hours. The bit saving factor is ⅛ in the C level stereo mode. Data are recorded at intervals of 8 sectors. The reproduction period of time is 1/16 in the C level monaural mode and data are recorded at intervals of 16 sectors. The reproduction period of time is about 16 hours.

For example, in the B level stereo mode, the audio information is discretely recorded in sector units at intervals of 4 sectors along the tracks from the first sector on the innermost track.

After the audio information is recorded on the outermost track, the audio information is recorded along tracks at intervals of four sectors form the second sector on the innermost to the outermost tracks. When the audio information which has been recorded in such a manner is reproduced, the data is not continuously reproduced so that playback music, for example, is interrupted while the playback head jumps to return from the outermost track to the innermost track.

A disc recording apparatus which records digital data which meets the standards of the above mentioned CD or CD-I on an optical disc, of a type which will be described hereafter, or an information rewritable magneto-optical disc has heretofore been provided. Also in this disc recording apparatus, the servo system of a focus servo or tracking servo for a recording head will deviate due to mechanical disturbances such as vibration or shock so that recording may be temporarily interrupted.

SUMMARY OF THE INVENTION

It is an object of the present invention to provide a disc recording apparatus which is capable of successively recording or reproducing data on recording tracks of a disc recording medium irrespective of turbulence of the servo system due to a disturbance.

A disc recording apparatus for recording inputted data on tracks on a disc recording medium of the present invention comprises memory means into which successively inputted data are sequentially written at a first transfer rate and from which the inputted data are read out at a second, higher transfer rate, and recording means for recording on the disc recording medium the data read form the memory means. Control means are provided for controlling the reading of the memory means so that data in a preset first amount are successively read from the memory means to always ensure a write space in the memory means which has a capacity which is higher than a predetermined second amount when the amount of the inputted data stored in the memory means exceeds the first amount. The control means is connected to the recording means to control the recording position on the disc recording medium so that data in the first amount which are sequentially read from the memory means in an interrupted manner are successively recorded on the recording tracks of the recording medium.

A disc reproducing apparatus for reproducing data successively recorded on tracks on a disc recording medium of the present invention comprises reproducing means for successively reproducing the recorded data at a second transfer rate which is higher than a first transfer rate required for outputting the reproduced data, and memory means into which the reproduced data read out by the reproducing means are sequentially written at the second transfer rate and from which the thus written data are successively read out as reproduced output data at the first transfer rate. Control means are provided which performs control of the writing of the reproduced data to the memory means so that a second amount of the reproduced data is written into the memory means and an amount of reproduced data, not less than a first amount, are always stored in the memory means when the amount of the reproduced data stored in the memory means becomes not higher than the first given amount. The control means also causes the reproducing means to control the reproduction position on the recording medium so that the reproduced data sequentially written into the memory mean in an interrupted manner are successively read from the recording tracks on the disc recording medium.

BRIEF DESCRIPTION OF THE DRAWINGS

FIGS. 4(a) to 4(f) are schematic views showing the sequential states of a memory which is controlled in the recording system of the disc recording/reproducing apparatus according to the invention;

FIGS. 5(a) to 5(f) are schematic views showing the sequential states of the memory which is controlled in the reproducing system of the disc recording/reproducing apparatus depicted in FIG. 1; and FIG. 6 is a diagram showing a data format of CD-I.

DESCRIPTION OF THE PREFERRED EMBODIMENTS

The embodiments of a disc recording apparatus and a disc reproducing apparatus of the present invention will be described with reference to the drawings.

Figure 1:
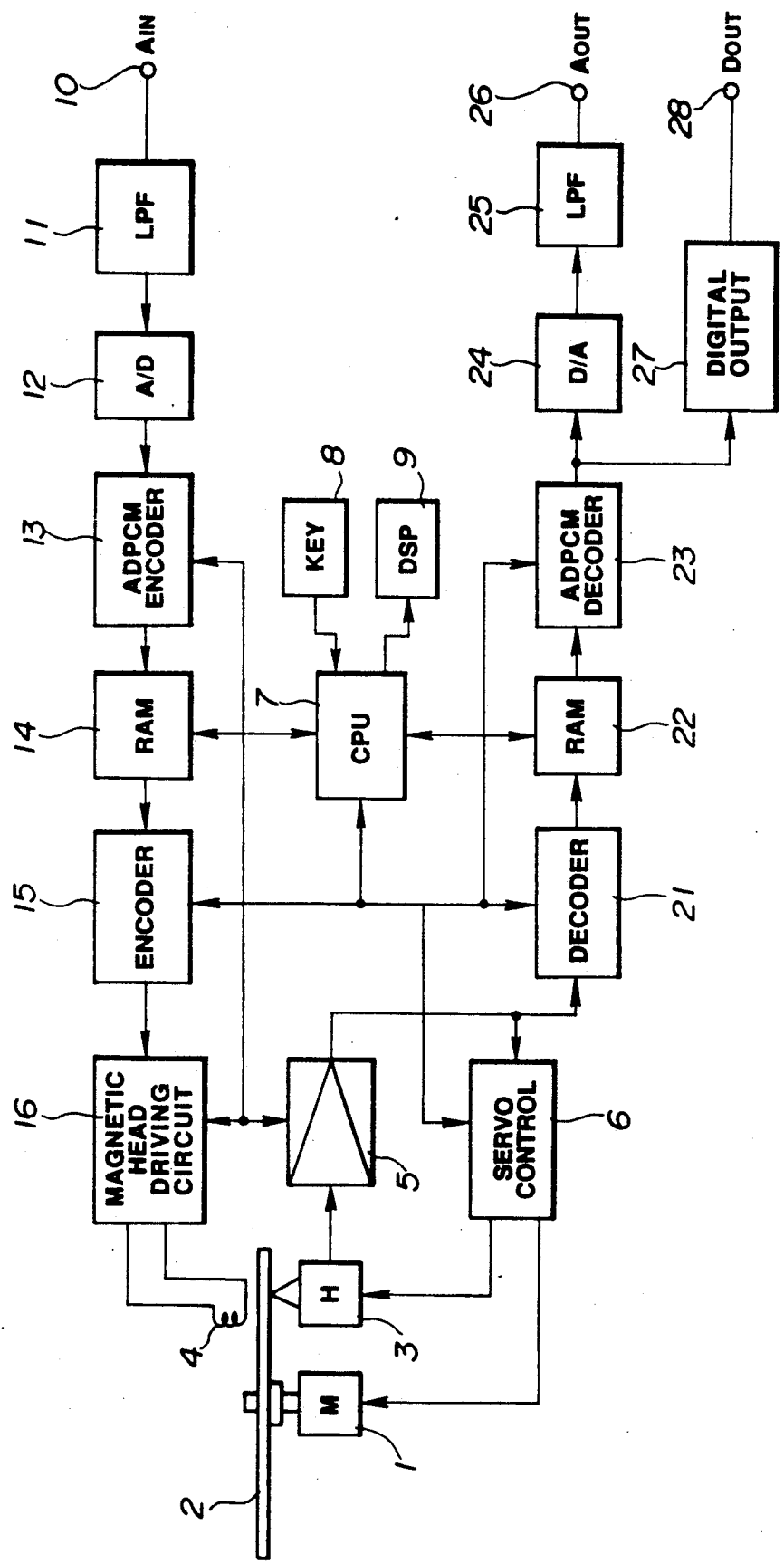
FIG. 1 is a block diagram showing the structure of a disc recording/reproducing apparatus of the present invention.
Figure 2:
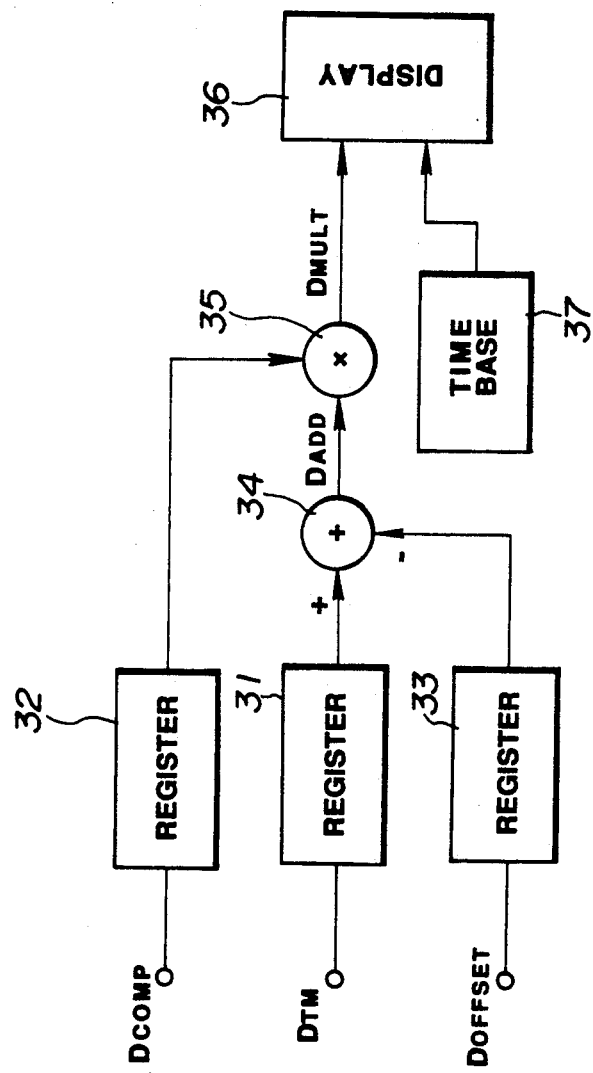
FIG. 2 is a block diagram showing the structure of a display unit in the disc recording/reproducing apparatus depicted in FIG. 1.

Referring now to FIG. 1, the disc recording/reproducing system includes a magneto-optical disc 2 serving as a recording medium which is driven to rotate at a given speed by a spindle motor 1. Recording of data along recording tracks (not shown) of the optical magnetic disc 2 is achieved by applying a magnetic field modulated in accordance with recording data by a magnetic head 4 while the magneto-optical disc 2 is irradiated with a laser light from an optical head 3. Reproduction of the recorded data is achieved by tracing the recording tracks on the optical magnetic disc 2 with a laser light from the optical head 8.

Although not shown in the figures, it will be understood by those skilled in the art that the optical head 3 comprises a laser light source such as a laser diode, optical components such as a collimator lens, an objective lens, a polarized light beam splitter, a cylindrical lens and a photodetector which are arranged in given positions. The optical head 3 is opposite to the magnetic head 4 so that the magneto-optical disc 2 is located between the heads 3 and 4. The optical head 3 directs a laser light beam upon a target track on the magneto-optical disc 2 to which is applied a magnetic field modulated in accordance with recording data. By driving the magnetic head 4 with a head driving circuit 16 of a recording system, which will be described hereafter, the data is recorded on the magneto-optical disc 2 by thermomagnetic recording.

The optical head 3 also detects the laser light reflected from the irradiated target track for detecting a focus error by, for example, a so-called astigmatism method or for detecting a tracking error by, for example so-called push-pull method, and generates a reproduced signal by detecting the difference in the polarization angle (Kerr rotational angle) of the laser light reflected from the target track when data is reproduced from the magneto-optical disc 2.

The output of the optical head 3 is supplied to an RF circuit 5. The RF circuit 5 extracts a focus error signal or a tracking error signal from the output of the optical head 3 for supplying them to a servo control circuit 6 and to code the reproduced signals to binary signals for supplying the binary coded signals to a decoder 21 of the reproducing system which will be described hereafter.

Although not shown in the figures, those skill in the art will understand that the servo control circuit 6 comprises, for example, a focus servo control circuit, a tracking servo control circuit, a spindle motor servo control circuit and a sled servo control circuit. The focus servo control circuit performs a focus control of the optical system (not shown) of the optical head 3 so that the focus error signal becomes zero. The tracking servo control circuit performs a tracking control of the optical system of the optical head 3 so that the tracking error signal becomes zero. The spindle motor servo control circuit controls the spindle motor 1 so that the magneto-optical disc 2 is driven to rotate at a given rotational speed. The sled servo control circuit moves the optical head 3 and the magnetic head 4 to the target track position of the magneto-optical disc 2 specified by a system controller (CPU) 7. The servo control circuit 6 which performs these various controls supplies the system controller 7 with information representative of the operational conditions of the various units controlled by the servo control circuit 6.

The system controller 7 is connected with a key input manipulating unit 8 and a display unit 9. The system controller 7 controls the recording system and the reproducing system in an operation mode (compression mode), specified by manipulation input information outputted from the key input manipulation unit 8. The system controller 7 controls the recording position and the reproducing position on the recording track traced by the optical head 3 and the magnetic head 4, respectively based upon address information of a sector unit reproduced from the recording track of the magneto-optical disc 2 by a header time and a sub-Q data. The system controller supplies the display unit 9 with an absolute time data $D_{TM}$ corresponding to the recording position and the reproducing position, a compression ratio data $D_{COMP}$ depending upon the operational modes of the recording system and the reproducing system, and an offset data $D_{OFFSET}$ for display so that the recording time and the reproducing time are displayed by the display unit 9.

Figure 3:
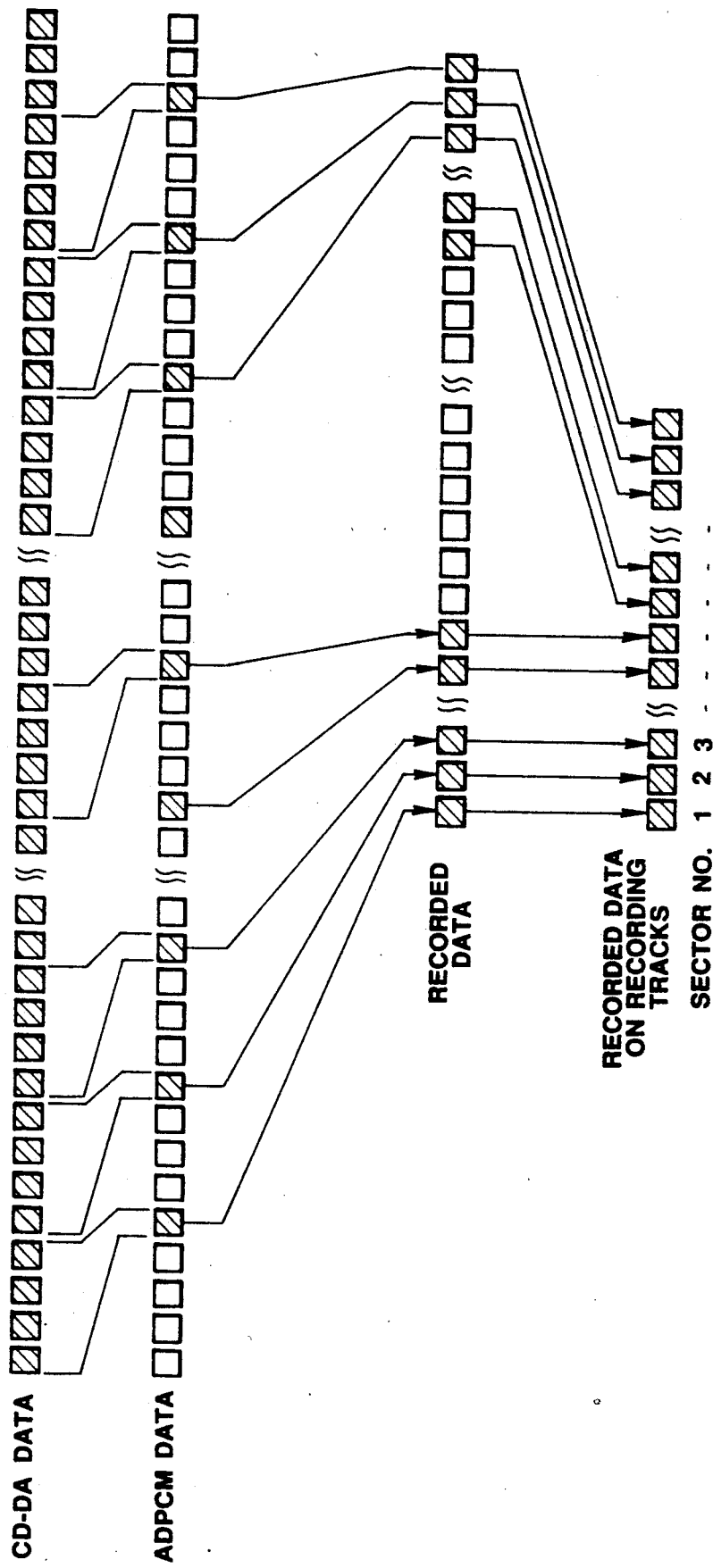
FIG. 3 is a schematic diagram showing a data format used for the disc recording/reproducing apparatus depicted in FIG. 1.

Referring now more particularly to FIG. 3, the display unit 9 comprises a subtracter 34 which is supplied with the absolute time data $D_{TM}$, via a first register 31, and the offset data $D_{OFFSET}$, via a second register 33. Also included is a multiplier 35 which is supplied with the compression ratio data $D_{COMP}$ from the system controller 7, via a third register 32, and is supplied with a subtraction output data $D_{ADD}$ from the subtracter 34. A display 36 is supplied with a multiplication output data $D_{MULT}$ from the multiplier 35.

The subtracter 34 subtracts the offset data $D_{OFFSET}$, which is temporarily stored in the second register 33, from the absolute time data $D_{TM}$ which is temporarily stored in the first register 31. That is, the subtracter 34 subtracts the offset data $D_{OFFSET}$ from the absolute time data $D_{TM}$, which are representative of the current recording position and the reproducing position in the recording system and the reproducing system, respectively, in accordance with the address information of the sector unit for forming the subtraction output data $D_{ADD}(=D_{TM}-D_{OFFSET})$. $D_{ADD}$ are representative of the elapsed absolute time of only the data of the program which is currently recorded or reproduced and is supplied to the multiplier 35.

The multiplier 35 multiplies the compression ratio data $D_{COMP}$, which are temporarily stored in the third register 32, with the subtraction output data $D_{ADD}$ from the subtracter 34. The multiplier 35 thus forms multiplication output data $D_{MULT}$, which are representative of an actual elapsed time of the current recording or reproducing program data, and supplies the display 36 with the multiplication output data $D_{MULT}$.

The display 36 then displays the actual elapsed period of time of only the data of the program which is currently recorded or reproduced based on the multiplication output data $D_{MULT}$. Although the actual time of only the program data is displayed in the above-mentioned embodiment, the total period of time until the present time may be displayed by selecting the value of $D_{OFFSET}$. The $D_{OFFSET}$ information is prepared based upon table of contents (TOC) data which have been preliminarily recorded upon the disc. The display 36 is also connected with a time base 37 which interpolation-displays a display time if the compression ratio of the recording system or the reproducing system is high or a time display in a small unit is necessary.

The recording system of the disc recording/ reproducing apparatus comprises an A/D converter 12 to which an analog audio signal $A_{IN}$ is supplied via a low pass filter 11 from an input terminal. The A/D converter 12 quantizes the audio signal $A_{IN}$ to form digital audio data of a given transfer rate (75 sectors/second) corresponding to the CD-DA mode in the above-mentioned CD-I system. The digital audio data obtained by the A/D converter 12 are supplied to an ADPCM encoder 13.

The ADPCM encoder 13 performs, in accordance with the various modes in the above-mentioned CD-I system, a data compression processing of the digital audio data of a given transfer rate which has been obtained by quantizing the audio signal $A_{IN}$ in the A/D converter 12. The operation mode is specified by the system controller 7. In this embodiment, it is assumed that the digital audio data of the CD-DA mode is converted into the ADPCM audio data of the B level stereo mode having a transfer rate of 18.75 (75/4) sectors/second by performing a data time-axis compression to $\frac{1}{4}$ by the ADPCM encoder 13. The ADPCM audio data of the B level stereo mode which are successively outputted at a transfer rate of 18.75 sectors/second from the ADPCM encoder 13 are supplied to a memory 14.

Writing or reading of the data to and from the memory 14 is controlled by the system controller 7. The ADPCM audio data of the B level stereo mode which are supplied from the ADPCM encoder 13 are sequentially written into the memory 14 at a transfer rate of 18.75 sectors/second and are thereafter read out in a burst from the memory 14 at a transfer rate of 75 sectors/second as recording data.

The system controller 7 successively writes the ADPCM audio data into the memory 14 at a transfer rate of 18.75 sectors/second by successively incrementing the write pointer W of the memory 14 at a transfer rate of 18.75 sectors/second as shown in FIGS. 4(a) to 4(b). Next, as shown in FIGS. 4(c) to 4(d) and again in FIGS. 4(e) to 4(f), the system controller 7 reads out from the memory 14 an amount K of the stored data in a burst, i.e. at a transfer rate of 75 sectors/second, as the recording data by incrementing the read pointer R of the memory 14 at a transfer rate of 75 sectors/second when the amount of the ADPCM audio data stored in the memory 14 exceeds the given value K. The ADPCM audio data, that is, the recording data which have been read in a burst at a transfer rate of 75 sectors/second from the memory 14 are supplied to the encoder 15.

The encoder 15 performs a coding processing or an EFM coding processing of the recording data supplied in a burst from the memory 14 for correcting the error. The recording data which have been subjected to coding processing by the encoder 15 are supplied to the magnetic head driving circuit 16.

The magnetic head driving circuit 16 is connected with the magnetic head 4 for driving it so that the magnetic field which is modulated in accordance with the recording data is applied to the magneto-optical disc 2.

The system controller 7 performs the above mentioned control of the memory 14 and the control of the recording position on the recording tracks so that the recording data which are read in a burst from the memory 14 by this memory control are successively recorded on the recording tracks of the magneto-optical disc 2 as shown in FIG. 3. The system controller 7 monitors the last position of the recorded data on the recording tracks of the magneto-optical disc 2, and supplies the servo control circuit 6 with a control signal for specifying the recording position according to the last position of the recorded data.

I the recording system of the disc recording/reproducing apparatus, the ADPCM audio data sequentially outputted at a transfer rate of 18.75 sectors/second from the ADPCM encoder 13 are written into the memory 14 at a transfer rate of 18.75 sectors/second by the above mentioned memory control of the system controller 7. When the amount of the ADPCM audio data stored in the memory 14 exceeds a given amount K, the ADPCM audio data are read in a burst at a transfer rate of 75 sectors/second as recorded data from the memory 14. Preferably the given amount of data is not less than a minimum recording unit of the recording data. Therefore, input data can be successively written into the memory 14 while always ensuring a data write area having a capacity of more than a given amount in the memory 14.

The recorded data which are read out from the memory in a burst can be recorded on the recording tracks of the magneto-optical disc 2 in a successive manner by controlling the recording position on the recording track of the magneto-optical disc 2 by the system controller 7. As mentioned above, the data write area having a capacity of more than a given amount is always assumed in the memory 14. Accordingly, if the operation of recording on the magneto-optical disc is interrupted by the occurrence of a track jump or other accident due to a disturbance which is detected by the system controller 7, a recovery operation can be carried out while inputted data continue to be written into the data write area having a capacity of more than a given amount and the inputted data can be recorded on the recording track of the magneto-optical disc 2 in a successive manner.

A header time data (absolute time information) corresponding to the physical address of the sector is added to the ADPCM audio data for each sector and recorded upon the magneto-optical disc 2. Table-of-contents (TOC) data representative of the recording area and the recording mode are recorded on a table-of-contents (TOC) area preset on the disc at a predetermined position.

The reproducing system of the disc recording/reproducing apparatus will now be described. The reproducing system reproduces the data which have been successively recorded on the recording track of the magneto-optical disc 2 by the recording system as mentioned above. The reproducing system comprises a decoder 21 which is supplied with reproduced outputs which are obtained by tracing the recording track of the magneto-optical disc 2 with a laser light generated by the optical head 3 and are binary coded by the RF circuit 5.

The decoder 21 corresponds to the encoder 15 and performs processing such as error correction decoding processing and EFM decoding processing of the reproduced outputs which are binary coded by the RF circuit 5. The output of the decoder 21 is the ADPCM audio data of the above mentioned 8 level stereo mode at a transfer rate of 75 sectors/second which is higher than a normal transfer rate in the B level stereo mode. The reproduced data obtained by the decoder 21 are supplied to the memory 22.

Writing and reading of data to and from the memory 22 are controlled by the system controller 7 so that the reproduced data supplied at a transfer rate of 75 sectors/second from the decoder 21 are written to the memory 22 in a burst at a transfer rate of 75 sectors/second and are sequentially read out from the memory 22 at a normal transfer rate of 18.75 sectors/second of the B level stereo mode.

The system controller 7 writes the reproduced data into the memory 22 at a transfer rate of 75 sectors/second by incrementing a write pointer W of the memory 22 and successively reads the reproduced data at a transfer rate of 18.75 sectors/second from the memory 22 by successively incrementing a read pointer R of the memory 22 at a transfer rate of 18.75 sectors/second. As best shown in FIGS. 5(a) to 5(b), the controller 7 performs the memory control by incrementing the write pointer W of the memory 22 in a burst at a transfer rate of 75 sectors/second to stop writing when the write pointer W catches up with the read pointer R (FIG. 5(c)) and to start writing when the amount of the reproduced data stored in the memory 22 exceeds a given amount L (FIGS. 5(d) to 5(e)). Preferably, the given amount of data is not less than a minimum recording unit of the recording data.

The system controller 7 not only controls the memory 22, as described above, but also controls the reproducing position on the recording tracks so that the reproduced data which are successively written into the memory 22 in a burst by this memory control are successively reproduced from the recording track of the magneto-optical disc 2. The system controller 7 monitors the last position of the reproduced data on the recording tracks of the magneto-optical disc 2, and supplies the servo control circuit 6 with a control signal for specifying the reproducing position according to the last position of the reproduced data.

The ADPCM audio data of the B level stereo mode which are obtained as reproduced data successively read out from the memory 22 at a transfer rate of 18.75 sectors/second are supplied to ADPCM decoder 23.

The ADPCM decoder 23 corresponds to the ADPCM encoder of the recording system. The operation mode of the ADPCM decoder 23 is specified by the system controller 7. In this embodiment, the decoder 23 reproduces the digital audio data by extending the ADPCM audio data of the B level stereo mode to four times. The digital audio data are supplied to the D/A converter 24 from the ADPCM decoder 23.

The D/A converter 24 converts the digital audio data supplied from the ADPCM decoder 23 into analog audio signals $A_{OUT}$ and outputs them from an output terminal 26 via a low pass filter 25. Digital audio signals $D_{OUT}$ from the ADPCM decoder 23 are output at a digital output terminal 28 via a digital output encoder 27.

In the reproducing system of the disc recording/reproducing apparatus, the ADPCM audio data of the B level stereo mode reproduced from the recording track of the magneto-optical disc 2 are written in a burst into the memory 22 at a transfer rate of 75 sectors/second and the ADPCM audio data are successively read out from the memory as reproduced data at a transfer rate of 18.75 sectors/ second under memory control by the system controller 7. Accordingly, the reproduced data can be successively read out from the memory 22 while always ensuring a data read area having a capacity of more than an amount L in the memory 22.

The reproducing data which are read out in a burst from the memory 22 can be reproduced from the recording track of the magneto-optical disc 2 in a successive manner by controlling the reproducing position on the recording track of the magneto-optical disc 2 by the system controller 7. Since a data read area having a capacity of more than an amount L is always ensured in the memory 22 as mentioned above, the analog audio signal continues to be outputted by reading reproduced data from the data read out area having a capacity of more than L and the recovery processing operation can be performed during that time even if the reproducing operation of the magneto-optical disc 2 is interrupted by the occurrence of a t rack jump due to a disturbance which is detected by the system controller 7.

The display unit 9 of the disc recording/ reproducing apparatus forms an addition output data $D_{ADD}$ ($=D_{TM}-D_{OFFSET}$). $D_{ADD}$ is representative of the elapsed absolute period of time of only the data of a currently recorded or reproduced program and is formed by subtracting the offset data $D_{OFFSET}$ from the absolute time data $D_{TM}$ representative of the current recording position or reproducing position in the recording or reproducing system, respectively, depending upon the address information in the sector unit supplied from the system controller 7 as mentioned above. The display unit 9 forms multiplication output data $D_{MULT}$ which is representative of the actual elapsed period of time of the currently recorded or reproduced program data by multiplying the addition output data $D_{ADD}$ with the compression ratio data $D_{COMP}$, that is, by the factor 4 in the B level stereo mode. Thus, the actual elapsed period of time of only the currently recorded or reproduced program data can be displayed based upon the multiplication output data $D_{MULT}$.

Although the embodiment of the disc recording/reproducing apparatus has been described with reference to recording and reproducing of the ADPCM audio data in the B level stereo mode, recording and reproducing of the ADPCM audio data of the other mode in the other CD-I system can be performed. It will suffice to perform a time-axis compression processing of the PCM audio data of CD-DA mode in the memory 22 for recording the recorded data while driving the magneto-optical disc 2 to rotate at a speed depending upon the compression ratio of the time axis compression processing in the recording system and to perform a time-axis extension processing in the memory 22 in the reproducing system.

In the disc recording apparatus of the present invention as mentioned above, input data to be successively inputted are sequentially written into memory means. When the amount of the input data stored in the memory means exceeds a given amount, the stored input data are sequentially read out of the memory means, as recording data, in a burst at a transfer rate which is higher than the transfer rate of the input data. Accordingly, the input data can be successively written into the memory means while always ensuring the presence of a data write area having a capacity of more than a given amount in the memory means. The recording data which are read out from the memory means in a burst are recorded on the recording tracks in a successive manner by controlling the recording position on the recording tracks on the disc recording medium.

A data write area having a capacity of more than a given value is always ensured in the memory means as mentioned above. Therefore, the input data can continue to be written into the memory means even if the recording operation on the disc recording medium is interrupted by a track jump or other accident occurs due to disturbances and the recovery operation can be performed during this interruption. The input data can be thus recorded on the recording tracks of the disc recording medium in a successive manner. Therefore, the present invention provides a disc recording apparatus which is capable of successively recording data on the recording tracks of the disc recording medium irrespective of turbulence of servo system due to a disturbance.

In the disc reproducing apparatus, the data recorded on the disc recording medium, which is driven to rotate at a given speed, are sequentially reproduced at a transfer rate which is higher than a given transfer rate at which the reproduced data are to be output. The recorded data are reproduced by reproducing means and are sequentially written in the memory means at the high transfer rate and are thereafter successively read out from the memory means as reproduced output data at the lower, given transfer rate. Accordingly, the reproduced output data can be successively readout from the memory means while always ensuring the presence of a data read area, having a capacity which is higher than a given value, in the memory means.

The reproduced data which have been written into the memory means in a burst are reproduced from the recording tracks in a successive manner by controlling the reproduction position on the recording tracks of the disc recording medium. Since a data read area having a capacity of more than the given value is always ensured in the memory means as mentioned above, the reproduction data can continue to be read out from the memory means even if reproduction operation of the disc recording medium is interrupted when a track jump or other accident occurs due to a disturbance. A recovery operation can be performed during this interruption and the reproduced audio signals can be successively outputted.

Therefore, the present invention can provide a disc reproduction apparatus which is capable of successively reproducing data from the recording tracks on the disc recording medium irrespective of the turbulence of the servo system due to a disturbance.

Although the present invention has been shown and described with respect to preferred embodiments, various changes and modifications which are obvious to a person skilled in the art to which the invention pertains are deemed to lie within the spirit and scope of the invention as claimed.

What is claimed is:

1. A disc recording apparatus for recording inputted data on tracks on a disc recording medium comprising:
   control means for controlling the reading of the memory means so that data in a first amount are successively read from the memory means when the amount of the inputted data stored in the memory means exceeds the first amount in order to always ensure a write area for writing the data in the memory means, the write area having a capacity higher than a predetermined second amount of the inputted data, the control means being connected to the recording means to control the recording position on the disc recording medium so that the first amount of the data which are sequentially read from the memory means are successively recorded on the recording tracks of the recording medium;
   recording means for recording on the disc recording medium the data read from the memory means;
   control means for controlling the reading of the memory means so that data in a preset first amount are successively read from the memory means to always ensure a write space in the memory means which has a capacity which is higher than a predetermined second amount when the amount of the inputted data stored in the memory means exceeds the first amount, the control means being connected to the recording means to control the recording position on the disc recording medium so that data in the first amount which are sequentially read from the memory means are successively recorded on the recording tracks of the recording medium.

2. A disc recording apparatus as defined in claim 1 in which the first amount of data is not less than a minimum recording unit of the recording data.

3. A disc recording apparatus as defined in claim 2 in which the control means stops reading the data form the memory means when the recording means becomes incapable of recording, due for example to a physical disturbance of the recording medium, and thereafter resumes reading the data from the memory means after the recording means is again capable of recording.

4. A disc recording apparatus as defined in claim 3 in which the second given amount of data is not less than the amount of data which is written in the memory means during the time that the recording means is incapable of recording.

5. A disc recording apparatus as defined in claim 1 in which the input data are time-axis compressed data.

6. A disc recording apparatus as defined in claim 5 in which a key for presetting the time-axis compression ratio of the input data is provided.

7. A disc recording apparatus as defined in claim 5 further including an ADPCM encoder and in which the input data are written into the memory means via an ADOCM encoder.

8. A disc recording apparatus as defined in claim 1 in which the disc recording medium is a magneto-optical recording medium.

9. A disc recording apparatus as defined in claim 1 wherein an absolute time information corresponding to the recording position on the disc together with the recording data are recorded on the recording medium.

10. A disc recording apparatus for reproducing data successively recorded on tracks on a disc recording medium comprising:
reproducing means for successively reproducing the recorded data at a second transfer rate which is higher than a first transfer rate required for outputting the reproduced data;
memory means into which the reproduced data read out by the reproducing means are sequentially written at the second transfer rate and from which the thus written data are successively read out as reproduced output data at the first transfer rate; and
control means for controlling the writing of the reproduced data to the memory means so that a second amount of the reproduced data is written into the memory means and an amount of reproduced data, not less than a first amount, are always stored in the memory means when the amount of the reproduced data stored in the memory means becomes not higher than the first given amount, the control means also causes the reproducing means to control the reproduction position on the recording medium so that the reproduced data sequentially written into the memory means in an interrupted manner are successively read form the recording tracks on the disc recording medium.

11. A disc recording apparatus as defined in claim 10 in which the first given amount of data is not less than a minimum recording unit of the recording data.

12. A disc recording apparatus as defined in claim 11 in which the control means stops writing the reproduced data into the memory means when the reproducing means becomes unable to reproduce the recorded data, due for example to a physical disturbance of the recording medium and thereafter resumes writing the reproduced data into the memory means after the reproducing means is again capable of reproducing the recorded data.

13. A disc recording apparatus as defined in claim 12 in which the first given amount of data is not less than the amount of data outputted from the memory means during the time the reproducing means is incapable of reproducing the recorded data.

14. A disc recording apparatus as defined in claim 10 in which the reproduced data read out from recording medium are time-axis compressed data.

15. A disc recording apparatus as defined in claim 10 in which the reproduced data read out by the reproducing means includes absolute time information corresponding to the reproduction position on the disc.

16. A disc recording apparatus as defined in claim 15 and including a display means for displaying reproduction time information depending upon absolute time information obtained by the reproducing means, and including means for multiplying the absolute time information by the ratio of the time of the actual reproduced output data to the reproduced absolute time and supplying the product of such multiplying to the display means.

17. A disc recording apparatus for recording inputted data on tracks on a disc recording medium and reproducing data from the tracks on the disc, comprising:
control means for controlling the reading of the memory means so that data in a first amount are successively read form the memory means when the amount of the inputted data stored in the memory means exceeds the first amount, in order to always ensure a write area for writing the data in the memory means, the write area having a capacity higher than a predetermined second amount of the inputted data, the control means being connected to the recording means to control the recording position on the disc recording medium so that the first amount of the data which are sequentially read from the memory means are successively recorded on the recording tracks of the recording medium;
recording means for recording on the disc recording medium the data read from the memory means;
control means for controlling the reading of the memory means so that data in a preset first amount are successively read form the memory means to always ensure a write space in the memory means which has a capacity which is higher than a predetermined second amount when the amount of the inputted data stored in the memory means exceeds the first amount, the control means being connected to the recording means to control the recording position on the disc recording medium so that data in the first amount which are sequentially red form the memory means are successively recorded on the recording tracks of the recording medium;
reproducing means for successively reproducing the recorded data at a second transfer rate which is higher than a first transfer rate required for outputting the reproduced data;
memory means into which the reproduced data read out by the reproducing means are sequentially written at the second transfer rate and from which the thus written data are successively read out as reproduced output data at the first transfer rate; and
control means for controlling the writing of the reproduced data to the memory means so that a second amount of the reproduced data is written into the memory means and an amount of reproduced data, not less than a first amount, are always stored in the memory means when the amount of the reproduced data stored in the memory means becomes hot higher than the first given amount the control means also causes the reproducing means to control the reproduction position on the recording medium so that the reproduced data sequentially written into the memory means in an interrupted manner are successively read form the recording tracks on the disc recording medium.

* * * * *